(12) United States Patent
Juds

(10) Patent No.: US 7,264,169 B2
(45) Date of Patent: Sep. 4, 2007

(54) COALIGNED BAR CODES AND VALIDATION MEANS

(75) Inventor: Scott Juds, Seattle, WA (US)

(73) Assignee: IDX, Inc., ElDorado, AK (US)

( * ) Notice: Subject to any disclaimer, the term of this patent is extended or adjusted under 35 U.S.C. 154(b) by 354 days.

(21) Appl. No.: 10/902,928

(22) Filed: Aug. 2, 2004

(65) Prior Publication Data

US 2006/0022059 A1    Feb. 2, 2006

(51) Int. Cl.
*G06K 7/10*    (2006.01)
(52) U.S. Cl. ............ 235/468; 235/462.01; 235/462.45; 235/472.01
(58) Field of Classification Search ............ 235/462.01, 235/462.45, 468, 472.01
See application file for complete search history.

(56) References Cited

U.S. PATENT DOCUMENTS

| | | | |
|---|---|---|---|
| 3,279,826 A | 10/1966 | Rudershousen | |
| 3,633,989 A | 1/1972 | Benton | |
| 3,829,662 A | 8/1974 | Furahashi | |
| 4,034,211 A | 7/1977 | Horst et al. | |
| 4,041,279 A | 8/1977 | Foote | |
| 4,044,231 A | 8/1977 | Beck et al. | |
| 4,119,361 A | 10/1978 | Greenway | |
| 4,202,491 A | 5/1980 | Suzuki | |
| 4,538,059 A | 8/1985 | Rudland | |
| 4,641,017 A | 2/1987 | Lopata | |
| 4,942,112 A | 7/1990 | Monroe et al. | |
| 4,996,120 A | 2/1991 | Smothers et al. | |
| 5,059,776 A | 10/1991 | Antes | |
| 5,101,184 A | 3/1992 | Antes | |
| 5,291,009 A | 3/1994 | Roustaei | |
| 5,306,899 A | 4/1994 | Marom | |
| 5,336,871 A | 8/1994 | Colgate | |
| 5,422,744 A | 6/1995 | Katz et al. | |
| 5,460,646 A | 10/1995 | Lazzouni | |
| 5,502,304 A | 3/1996 | Berson | |
| 5,600,116 A | 2/1997 | Seo et al. | |
| 5,920,058 A | 7/1999 | Weber et al. | |
| 6,006,991 A * | 12/1999 | Faklis et al. ............ | 235/462.06 |
| 6,203,069 B1 | 3/2001 | Outwater | |
| 6,328,209 B1 | 12/2001 | O'Boyle | |
| 6,354,501 B1 | 3/2002 | Outwater | |
| 6,521,038 B2 | 2/2003 | Yanagimoto | |
| 6,535,638 B2 | 3/2003 | McGrew | |
| 6,607,128 B1 | 8/2003 | Schwartz et al. | |
| 6,669,093 B1 * | 12/2003 | Meyerson et al. ..... | 235/472.01 |

* cited by examiner

*Primary Examiner*—Karl Frech
*Assistant Examiner*—April A. Taylor
(74) *Attorney, Agent, or Firm*—Diller, Ramik & Wight

(57) ABSTRACT

A security mark having multiple optically orthogonal coaligned bar codes is produced using a reflection hologram visible substantially at only a first wavelength that is layered over a wavelength sensitive filter, which blocks light transmission at the first wavelength but transmits light at a second wavelength, and having beneath it an additional bar code visible through the hologram and the wavelength sensitive filter at the second wavelength. A validation means reads multiple holographic bar codes with light at the first wavelength by illuminating the hologram separately from multiple directions, and further reads the bar code beneath the wavelength sensitive filter by illuminating the mark with light of the second wavelength. By suitable choice of multi-directional and multi-wavelength illumination, multiple coaligned bar codes may be read in the same physical location with no mutual interference.

14 Claims, 11 Drawing Sheets

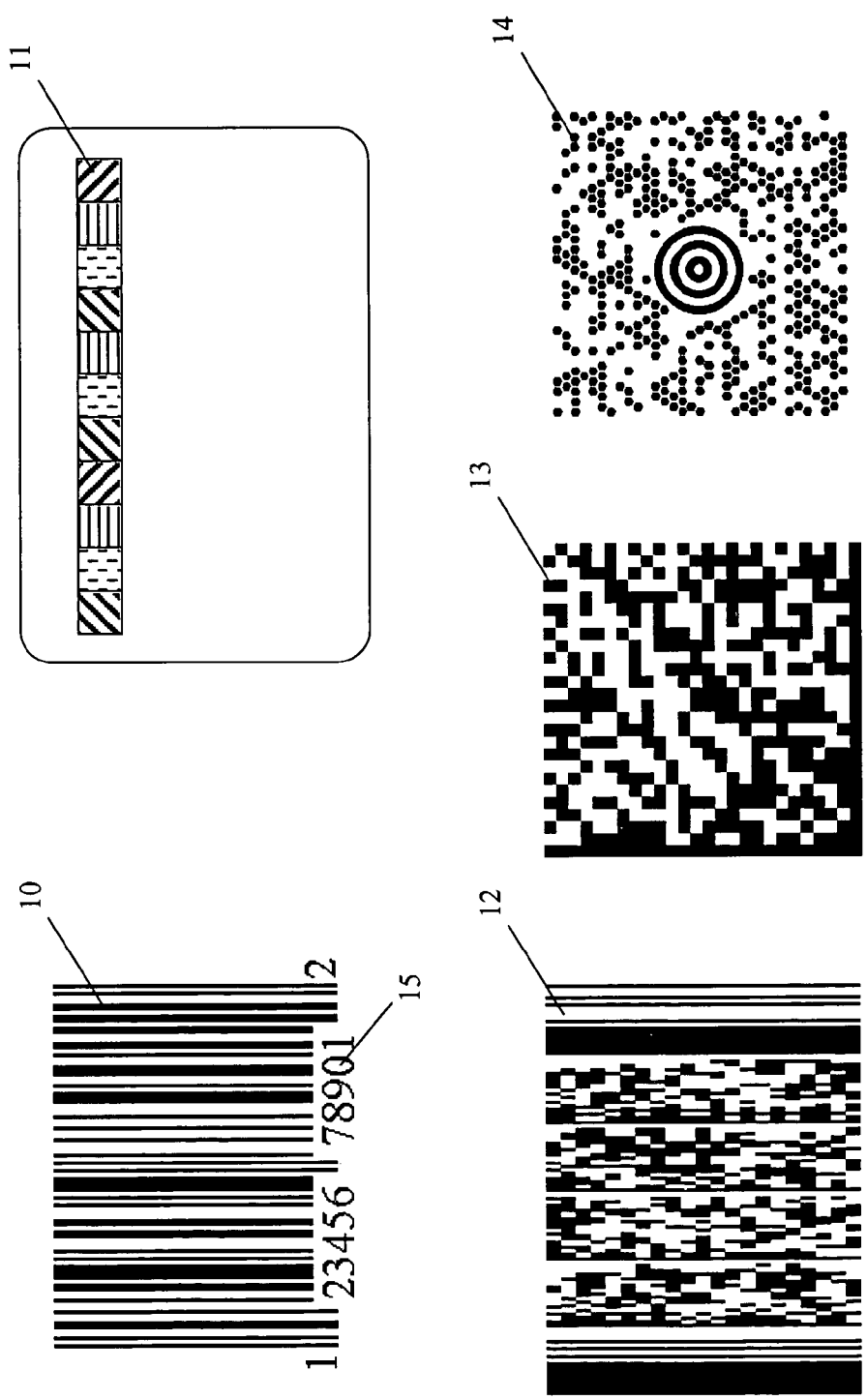

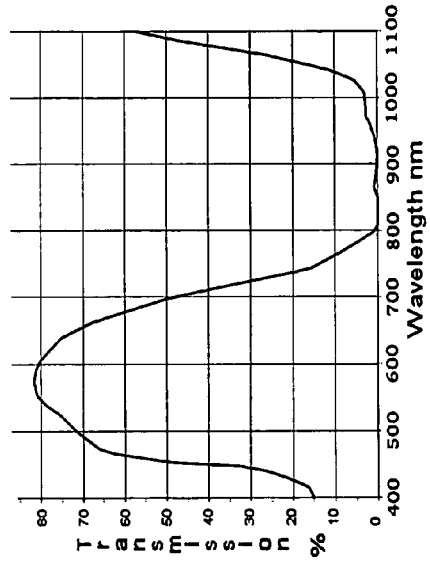
Fig. 5
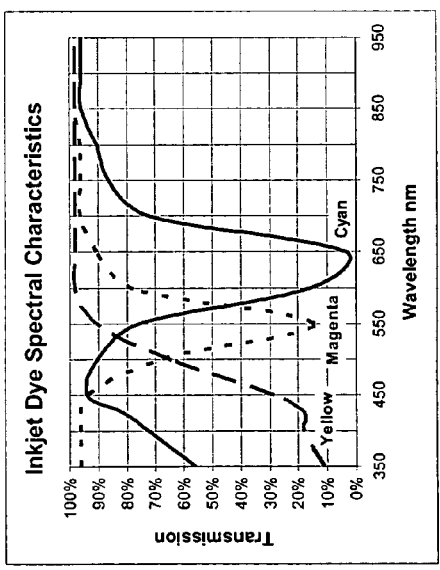
Fig. 6
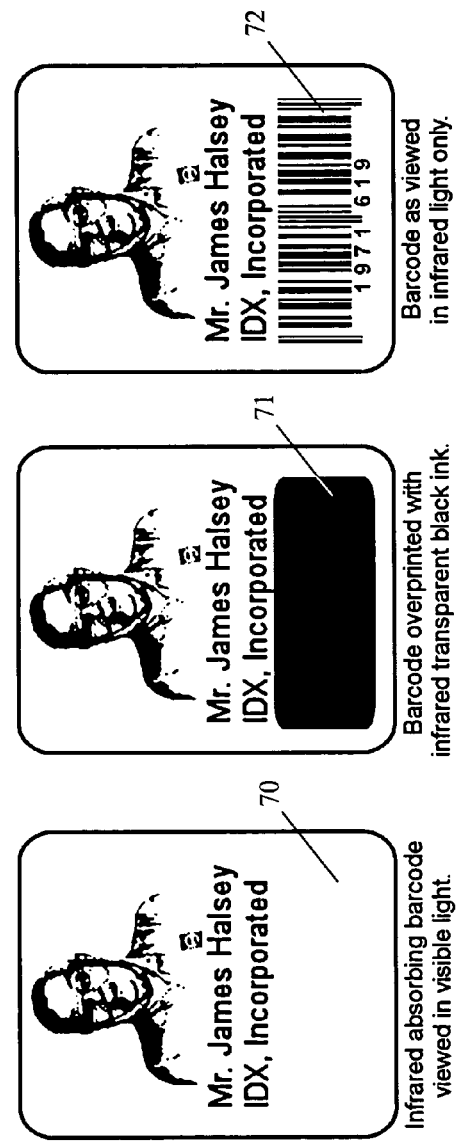
Fig. 7a
Infrared absorbing barcode viewed in visible light.
Fig. 7b
Prior Art
Barcode overprinted with infrared transparent black ink.
Fig. 7c
Barcode as viewed in infrared light only.

Diffuse - Lambertian Reflector

Specular - Mirror Reflector

Specular Holographic Reflector

Partially Diffused Holographic Reflector

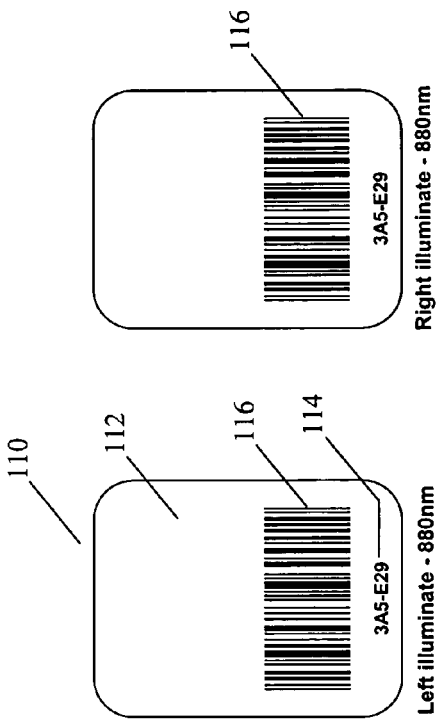
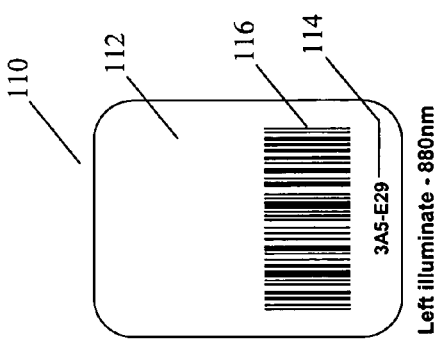
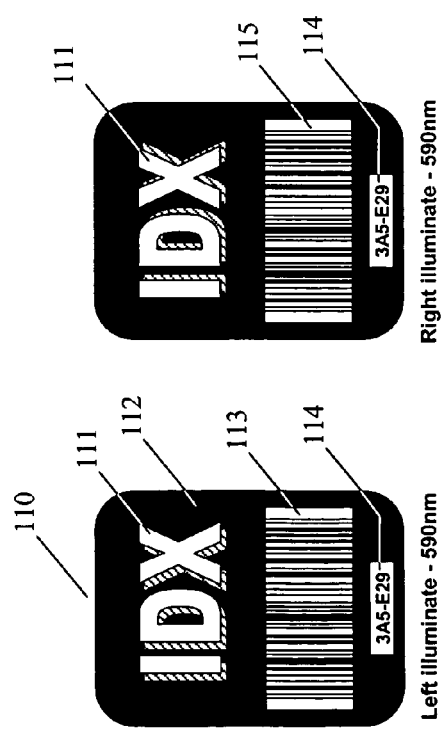
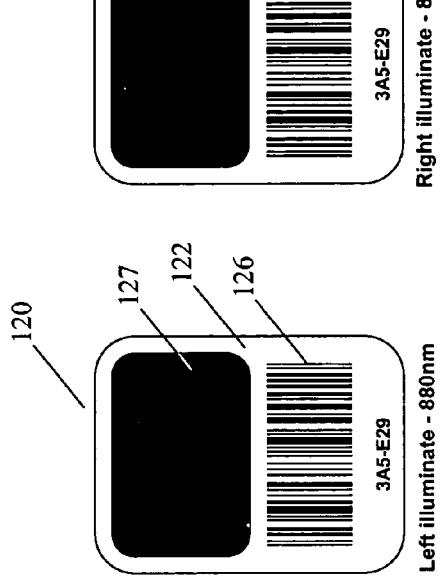
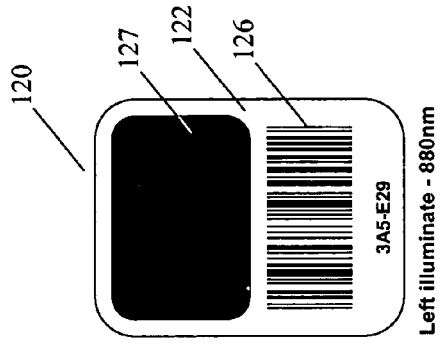
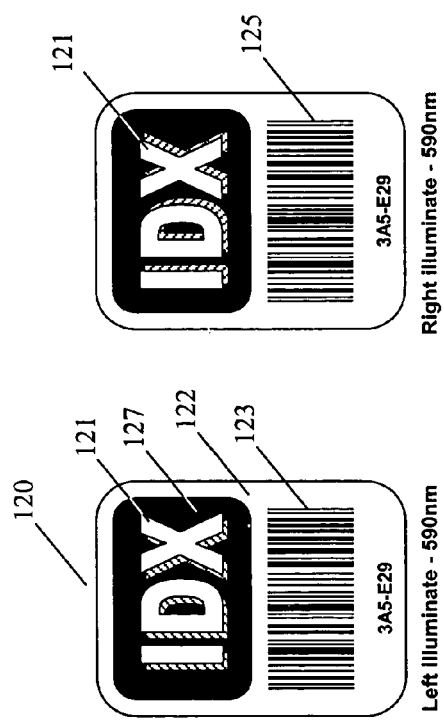

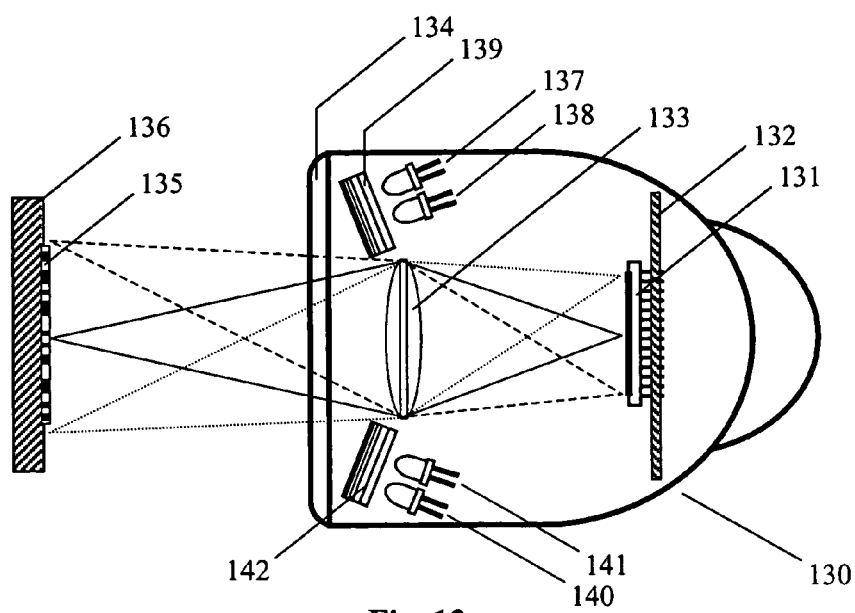
Fig. 13a
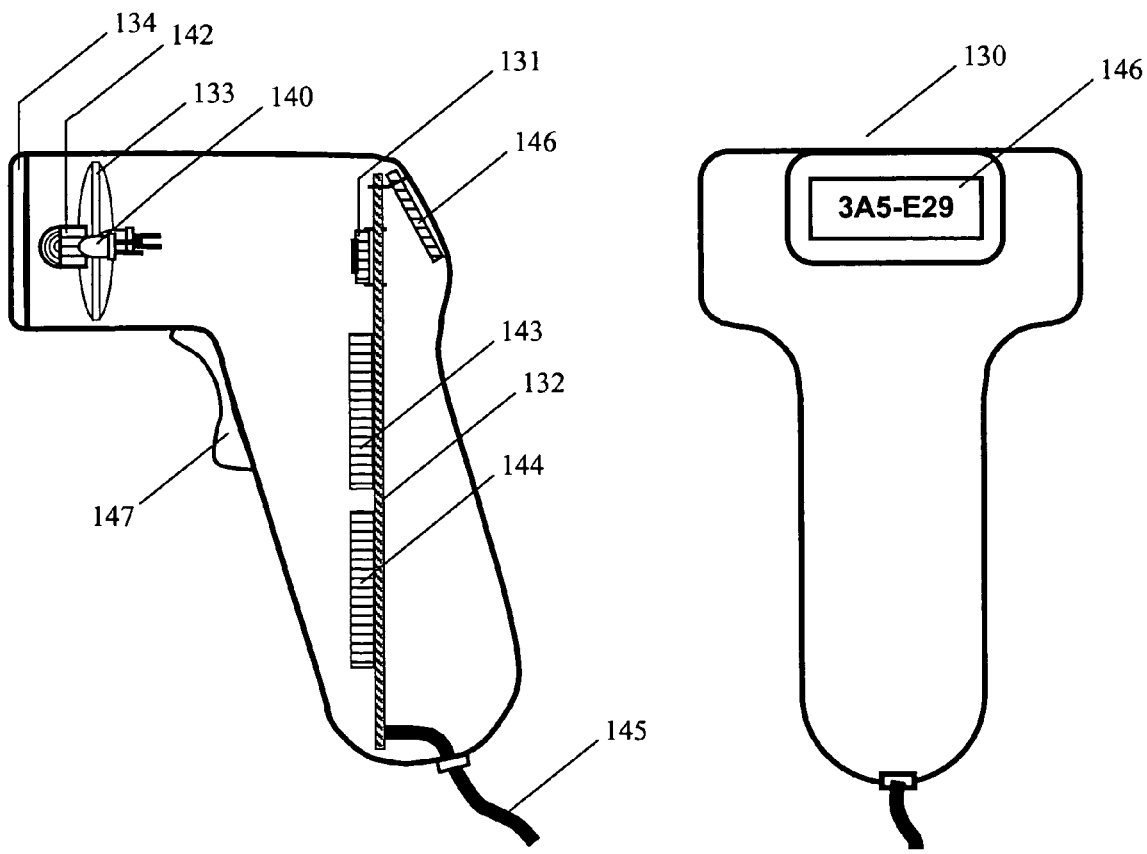
Fig. 13b
Fig. 13c

COALIGNED BAR CODES AND VALIDATION MEANS

FIELD OF THE INVENTION

This invention pertains to product and document authentication, and in particular to machine readable bar codes adapted to be associated with labels, tags, cards, containers, products, goods or other articles wherein multiple coaligned bar codes, both overt and covert, are used to secure the mark media, provide serial number identification, and permit sufficient omnidirectional readability with a hand-held mark validation device. The term bar code as used herein includes the broader definition incorporating both linear and two dimensional symbologies. The term authentication mark or security mark pertains to the portion of a label, tag, card or other article that embodies the coaligned bar codes and confirmation code as described herein.

BACKGROUND OF THE INVENTION

Lost sales revenue from counterfeit branded goods is a significant problem for the legitimate manufacturers. The use of counterfeit access cards results in significant theft loss from access to otherwise secured accounts, or results in the critical security breeches at secured military or industrial sites. While many forms of security marks have been devised to discourage counterfeiting, the degree of security afforded by any such mark is, of course, dependant on the cost of counterfeiting it relative to the value gained for having done so. Generally, any particular security mark declines in effectiveness over time because the specialty machinery and materials required to produce the security mark become lower in cost and more easily accessible. Eventually new security marks that are more difficult to counterfeit are required, leading to a classical "arms race" scenario between designers of security marks and the mark counterfeiters.

One way to categorize mark authenticity verification is by: a) human verification, or b) machine verification. Common examples of each include a) the human verifiable hologram embedded in the front face of most of today's credit cards, and b) the machine verifiable encrypted codes within the microcontroller chip embedded in the newer so called "smart cards". Another way to categorize mark authenticity verification is by: a) local verification, or b) remote verification. With local verification, the mark must speak for itself. Local verification examples include seeing the holographic NFL label inside a baseball cap, or entering a PIN to match the information read from a magnetic strip by a card reader on a debit card. With remote verification, the validity or authenticity is not known until a remote database verifies the presented information, for example, by confirmation of an account number, a password, and funds available to make a purchase.

Methods used to aid human verification of a mark have primarily centered around the visual qualities of a label or tag. Beyond fancy printing, custom label stock, or molded tags, the most notable visual security mark common today is a custom hologram sticker having a stylized graphic of a company or organization logo to provide clear visual verification of authenticity. The most common type of hologram used is a metalized embossed polyester "rainbow hologram" well known on credit cards, software packages and professional sports branded articles. The rainbow hologram was originally developed by Polaroid Corporation, as disclosed in U.S. Pat. No. 3,633,989 granted Jan. 11, 1972 to Benton. Less common is the higher quality image of the volume reflection hologram with its fairly monochromatic images produced with photopolymers, such as the DuPont HRF-700 series, as disclosed in U.S. Pat. No. 4,996,120 granted on Feb. 26, 1991 to Smothers et al. and U.S. Pat. No. 4,942,112 granted Jul. 17, 1990 to Monroe et al. Unfortunately, the security of the rainbow hologram continues to fall prey to counterfeiters now finding it relatively easy to find companies offshore willing to copy and mass produce any image in a matter of days. However, for now the photopolymer based holograms appear to be relatively secure as the well patented photopolymers are treated as controlled materials. While fancy visual effects and 3-D logos may be helpful to people for evaluating the authenticity of an item, such human friendly security images haven't proven useful as a means for machines with optical scanners to independently determine the item's authenticity.

Numerous attempts have been made to secure documents with machine readable authentication marks. While everyday bar codes do a spectacular job at providing identity information, the mark itself is quite susceptible to duplication with a photocopy machine or with a desktop printer having a scanner, or one of hundreds of software packages available on the market for printing bar codes. Bar code scanners have been designed to detect and decode information from a light intensity pattern, but without any means for knowing if the bar code just scanned was on a box, on a book, printed with black ink, printed with blue ink, printed by a manufacturer in New York, or printed on the moon. A similar problem exists with the magnetic strip reader for credit, debit, and other ID cards. Although the magnetic strip will hold a fair amount of information, and is re-writable, the data on the magnetic stripe is easily copied or altered by hardware and software freely available on the market. Magnetic strip readers have been designed to detect and read a magnetic pattern, but without any means for knowing what card it was read from, if the information is fraudulent, or if the information is a counterfeit copy of the original.

To overcome the weakness in security of both bar codes and magnetic strips, some have incorporated an additional authentication code to help physically or logically machine validate the media or its data through requiring that the two code/data sources tie together in some way. As an example of the later, a card having both a magnetic recording strip and a linear series of diffraction grating patches on a strip, each reflecting light at a specific predetermined angle and requiring precise alignment in a scanner and wherein read data from each data source being compared to determine authenticity, is disclosed in U.S. Pat. No. 4,034,211 granted on Jul. 5, 1977 to Horst et al. An identification card having a magnetic strip with reflective marks over the magnetic strip is disclosed in U.S. Pat. No. 4,041,279 granted Aug. 9, 1977 to Foote. Similarly, a system of placing infrared reflection elements underlying a magnetic data stripe on a credit card is disclosed in U.S. Pat. No. 4,044,231 granted Aug. 23, 1977 to Beck et al. A card having both a magnetic strip and a reflection hologram with a linear series of reflective patches, each reflecting light at specific predetermined angle and requiring precise alignment in a scanner is disclosed in U.S. Pat. No. 4,641,017 granted on Feb. 3, 1987 to Lopata. A card having both a magnetic recording strip and a bar code, wherein read data from each are compared in an algorithm to determine authenticity is disclosed in U.S. Pat. No. 6,328,209 granted on Dec. 11, 2001 to O'Boyle. A label or card having a pattern of fluorescent dots, the locations of which are used to as a time-gate for reading the signature of diffractive/holographic reflections across the face of a card, requiring precise alignment with a scanner, and correlating data read with bar code or magnetic strip data, is disclosed in U.S. Pat. No. 6,535,638 granted on Mar. 18, 2003 to McGrew.

With the objective of making a covert code, or making a code copy machine proof, many have proposed systems utilizing the spectral limitations of the human eye in combination with inks that are invisible to the human eye, but fluoresce in the visible range when illuminated with ultraviolet (UV) or infrared (IR) light. Similarly, others have proposed systems that take advantage of inks that transmit or absorb light in the visible range, and do the opposite in the ultraviolet or infrared range. U.S. Pat. No. 3,279,826 granted Oct. 18, 1966 to Rudershousen describes a card having a UV fluorescent base material laminated with a material transparent in visible light, but which blocks UV light, and which has code markings or words made from or carved out of the UV blocking laminate. U.S. Pat. No. 3,829,662 granted Aug. 13, 1974 to Furahashi describes a card having a visibly black but infrared transparent layer under which is a base layer having a pattern of through holes which can only be detected with infrared light. U.S. Pat. No. 4,119,361 granted Oct. 10, 1978 to Greenway describes a card having a visibly black but infrared transparent layer under which is a linear arrangement of diffraction grating patches. U.S. Pat. No. 4,202,491 granted May 13, 1980 to Suzuki describes a data card containing data recorded with a fluorescent material that emits infrared rays when excited by infrared rays. U.S. Pat. No. 4,538,059 granted Aug. 27, 1985 to Rudland discloses an identification card with concealed coding made by infrared transparent windows of two widths providing binary coding readable by infrared radiation through material opaque to visible light. U.S. Pat. No. 6,203,069 granted Mar. 20, 2001 to Outwater describes a bar code printed in invisible ink that absorbs light in the UV or near-IR, and that has an IR fluorescent mark that emits visible light. U.S. Pat. No. 6,521,038 granted Feb. 18, 2003 to Yanagimoto, and U.S. Pat. No. 6,460,646 granted Oct. 4, 1995 to Lazzouni discloses visibly black but infrared reflecting inks to make it possible to print information which is not visible to the eye but is readable by infrared bar code scanners.

In addition to the savings of space, coaligned codes help increase the security of the media in two ways. First, in many cases an attempt to alter one of the codes disrupts the second, either physically or logically. Second, the copy resistance of the code is generally improved as at least one of the codes is implemented by an orthogonal technology. There are, for example, numerous methods referenced in prior patents relating to coaligned magnetic and optical codes. Coaligned bar codes utilizing wavelength discrimination also are present in the prior art. A multi-layered bar code made utilizing various non-interfering ink colors and reading them with specific wavelengths of light is disclosed in U.S. Pat. No. 5,502,304 granted Mar. 26, 1996 to Bearson. A bar code having the spaces between dark elements available for a possible UV fluorescent bar invisible to the human eye is disclosed in U.S. Pat. No. 6,354,541 granted Mar. 12, 2002 to Outwater. In matters of authentication, however, the security of colored inks is dubious today as they can be printed by any desktop color inkjet printer.

As various inventors have tried to make cards and labels more secure from copying while improving machine scanner authentication characteristics, the two characteristics of a hologram or diffraction grating used most often to advantage have been a) the ability to have a virtual mirror tilted at any angle while remaining physically flat and thin, and b) the ability to additionally incorporate holographic optical elements, such as lenses and optically encrypting distortion filters. Both of these characteristics require precise alignment of the scanner optics with the label or card to authenticate it, which is fine for a slot card reader, but would be a problem for the common hand-held bar code scanners used in retail and warehousing applications. U.S. Pat. No. 5,059,776 granted Oct. 22, 1991 to Antes discloses a diffractive bar code requiring precise alignment inside a scanner to benefit from the reflective bars. U.S. Pat. No. 5,101,184 granted Mar. 31, 1992 to Antes discloses a card with reflective patches having asymmetric diffraction gratings produced with partial microscopic mirror relief structures, pairs of which are 180 degrees different in the asymmetry and corresponding asymmetric reflection efficiency is used to verify authenticity of the mark. U.S. Pat. No. 5,306,899 granted Apr. 26, 1994 to Marom discloses a holographic correlation filter for examining a holographic image on a card, thus requiring precise position and angle relationships during reading. U.S. Pat. No. 5,920,058 granted Jul. 6, 1999 to Weber et al discloses that a holographic code image can be stored using a coded reference wave to distort the code image and thus hide it from human vision while a transform correlator reading device is able to reconstruct and detect the code image.

Holographic bar codes are known in the art. According to the broad definition of the term chosen for use herein, many of the patents in the foregoing paragraph describe forms of holographic bar codes, unfortunately, none of which are suitable for use with hand-held bar code scanners due to the requirement for precise optical alignment to successfully read the code. One way this has been overcome is to make a holographic image of a standard printed bar code wherein the white spaces have fairly omnidirectional diffuse reflecting characteristics, as disclosed in U.S. Pat. No. 5,422,744 granted on Jun. 6, 1995 to Katz et al. and U.S. Pat. No. 5,306,899 granted Apr. 26, 1994 to Marom. A card with an optically readable portion is incorporated into a magnetic machine readable stripe on the card wherein the optically readable portion can include a holographic representation of a bar code and wherein a check digit is derived by combining data from both optically and magnetically read portions is disclosed in U.S. Pat. No. 5,336,871 granted Aug. 9, 1994 to Colgate. Unfortunately, if the hologram produces a virtual image of a bar code, then even though standard bar code scanners can be easily aligned to read it, the security differentiation of it from a bar code printed on paper has vanished. Conversely, when the bar code is constructed of holographic of diffraction grating facets having very specific reflection angles, the security differentiation from a paper printed bar code may remain. However, the requirement for extremely precise alignment of the scanner precludes any real usefulness for applications requiring hand-held scanners.

Human readable characters have long been associated with bar codes, as exemplified by the ubiquitous UPC bar codes on grocery items (FIG. 1), and are most often used to provide an alternative for data entry when the bar code symbols are partly damaged and the bar code scanner fails to properly read them. In fact, a brief survey of bar coded objects and labels shows that it is more common than not to include a human readable number for these purposes. The more data-dense two dimensional bar codes, such as PDF417, Maxicode, and Datamatrix (FIG. 1), appear to rely heavily on other associated printed material, such as human readable address and order number, to provide sufficient backup should the contents of the bar code become unreadable, as opposed to having direct character per symbol translation. However, the human readable code has not been used as a true security feature in the authentication process.

In the art of bar code reading, utilization of multiple wavelengths has been disclosed by both Bearson and Outwater, as would be expected, for reading their bar codes having wavelength sensitive content. Many bar code reading disclosures include complex optical means to determine if the media on which the code is detected is in fact holographic. However, none have proposed multi-directional illumination as a means of ascertaining the three dimensional character of a hologram. Typically only a single light source is used, and when multiple sources are used from different directions, they still function as a single distributed light source, as opposed to having individual directions illuminated at separate times. For example, a bar code scanner head having a group of illuminating LEDs separately disposed to the right and left of the CCD photosensor optical path is disclosed in three U.S. patents; U.S. Pat. No. 5,291,009 granted on Mar. 1, 1994 to Roustaei, and U.S. Pat. No. 5,600,116 granted Feb. 4, 1997 to Seo et al., and U.S. Pat. No. 6,607,128 granted Aug. 19, 2003 to Schwartz et al. In each of the aforementioned patents, the LEDs are not separately illuminated, but rather are treated as a single extended illumination source.

The prior art holographic/diffractive bar code scanners either a) require precise alignment with the authentication mark to both read it and authenticate its media via detection of its unique holographic/diffractive optical properties, or b) require no special alignment with the authentication mark but are unable to authenticate its media because it is a virtual image replicating a paper and ink bar code. There is therefore an unmet need to both have a hand-held holographic bar code scanner without special alignment requirements to both read a holographic bar code and authenticate its media as being holographic.

The prior art coaligned code marks having magnetic strips and bar codes (of any kind) provide for both security and ID serialization, but are not suitable for hand-held scanner applications. The prior art coaligned wavelength sensitive printed bar code technology provides for ID serialization and hand-held scanner compatibility, but is substantially lacking in security today. Of further note, holographic bar codes are by their very nature heavily tooled and thus are compatible with mass production, but not ID serialization. There is therefore an unmet need to have a hand-held bar code scanner that can read a mark containing coaligned bar codes that provide both true security and capability for ID serialization.

The prior art uses alphanumeric characters adjacent to a bar code to provide a human readable representation of the code for backup when the bar code is damaged. With coaligned bar codes, the prior art presumption that the printed alphanumeric characters and the printed bar code should be directly tied is short sighted at best. There is therefore an unmet need in security applications to change the function of these alphanumeric characters to one of added security as opposed to simple redundancy.

SUMMARY OF THE INVENTION

The present invention relates to an authentication mark embedded on or attached or applied to a label, tag, card, container, product or article that provides for serialization capability of the mark, can be read by a hand-held bar code scanner capable of authenticating holographic media, and wherein a visual authentication code is provided at the completion of reading the mark for final comparison with a human readable visual code adjacent to the authentication mark.

A first aspect of the invention involves reading a holographic bar code with a hand-held bar code scanner, which will by its very hand-held nature have poor accuracy in alignment with the authentication mark. To overcome the alignment problem two possible methods may be used, each of which requires a fairly wide field of view of the holographic bar code elements. The first utilizes partially diffusing facets for the reflective code elements wherein the angle of reflection from the facet is spread, for example, over a 30 degree full width at half max angle such that the alignment accuracy may include this diffusing divergence angle. The second utilizes the properties of holographic facets in reverse. A volume reflection hologram is laminated over a white diffusing background which is visible to the scanner between the facets, and the facets are used to create a shadow on the white background by strategically directing the majority of incident light from an LED illumination source away from the collecting lens of a CCD type scanner array. Alignment is only limited by the ability of the facets to direct light away so as to create the dark elements of the bar code.

A second aspect of the invention involves authentication of the holographic media. By limiting the use of the hologram as described in the first aspect of the invention, holographic characteristics other than those involving precise alignment and certain kinds of embedded holographic optical elements must be used to achieve automated validation of the holographic media. One of the primary holographic characteristics that remain is the ability to produce a different image when illuminated from a different angle. To take advantage of this property, the hologram is made to produce the image of a first holographic bar code when illuminated from a first angle, and produce the image of a second holographic bar code when illuminated from a second angle. If each bar code is valid and each is different, then the holographic media is authenticated.

A third aspect of the invention involves the requirement that the authentication mark have serialization capability. Holographic bar codes, by their very nature, involve expensive tooling that make them cost effective only in mass production applications, each having the same set of holographic bar codes. To overcome this debilitating limit on providing serialization capability in the bar codes, a third coaligned infrared bar code is laminated beneath the holographic bar code in such a manner that the third bar code is not visible at the wavelength used to read the holographic bar codes (590 nm yellow for example), and the holographic bar codes are transparent at the wavelength used to read the infrared bar code (880 nm IR for example). The infrared bar code is printed by well known means allowing each and every bar code to be unique, thus adding serialization capability to the overall authentication mark.

A fourth aspect of the invention involves utilizing a human readable alphanumeric code adjacent to the coaligned bar codes of the authentication mark for purposes of security rather than for redundancy. The bar code scanner displays an alphanumeric confirmation code to the operator upon completion of reading the coaligned bar codes of the authentication mark. The displayed value is then compared to the human readable characters adjacent the authentication mark. The confirmation code can be; a) a functional cipher of the data from each of the coaligned bar codes, or b) a substantially random code otherwise only known to a database created at the authentication mark's time of manufacture.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a plan view, and shows prior art linear and two dimensional bar codes presently in use in the market.

FIG. 5 is a graph, and shows the transmission spectral responses for yellow, magenta, and cyan inkjet dyes.

FIG. 6 is a graph, and shows the transmission spectral response for MSC3600 printing ink produced by HW Sands Corp.

FIG. 7a is a plan view, and shows an ID badge in visible light with a bar code printed in visibly transmissive infrared absorbing ink.

FIG. 7b is a plan view, and shows an ID badge in visible light with a bar code overprinted with a patch of visibly absorbing infrared transmissive ink.

FIG. 7c is a plan view, and shows the ID badge of either 7a or 7b in infrared light.

FIG. 11a is a plan view, and shows a label with three coaligned bar codes illuminated from the left with 590 nm light.

FIG. 11b is a plan view, and shows a label with three coaligned bar codes illuminated from the right with 590 nm light.

FIG. 11c is a plan view, and shows a label with three coaligned bar codes illuminated from the left with 880 nm light.

FIG. 11d is a plan view, and shows a label with three coaligned bar codes illuminated from the right with 880 nm light.

FIG. 12a is a plan view, and shows a label with three coaligned bar codes illuminated from the left with 590 nm light.

FIG. 12b is a plan view, and shows a label with three coaligned bar codes illuminated from the right with 590 nm light.

FIG. 12c is a plan view, and shows a label with three coaligned bar codes illuminated from the left with 880 nm light.

FIG. 12d is a plan view, and shows a label with three coaligned bar codes illuminated from the right with 880 nm light.

FIG. 13a is a diagrammatic top plan view, and shows the hand-held bar code scanner for both holographic authentication and for covert infrared bar code reading.

FIG. 13b is a diagrammatic side elevation view of the hand-held bar code scanner for both holographic authentication and for covert infrared bar code reading of FIG. 13a.

FIG. 13c is a diagrammatic rear elevational view of the hand-held bar code scanner for both holographic authentication and for covert infrared bar code reading of FIGS. 13a and 13b.

DETAILED DESCRIPTION OF THE INVENTION

As used herein, the broader meaning of the term bar code will include both one and two dimensional symbologies such as UPC, Code 39, PDF417, Maxicode, and Datamatrix commonly known in the market. While the aforementioned codes all utilize binary optical intensity modulation, codes utilizing additional levels of intensity modulation, wavelength modulation, or reflection vector modulation are herein considered obvious prior art variants that fall within the definition of bar code as used herein. Various forms of prior art bar codes are shown in FIG. 1 for reference.

Figure 8A:
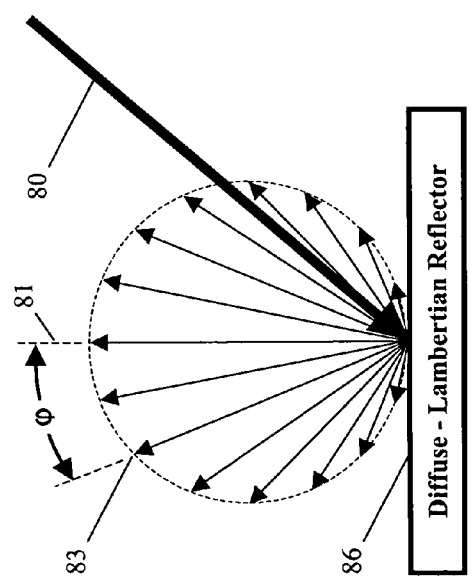
FIG. 8a is a diagrammatic view, and depicts a diffuse Lambertian reflector such as white paper.
Figure 8B:
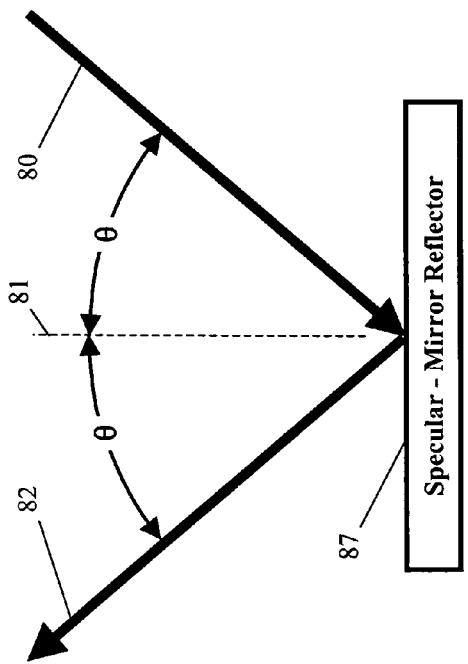
FIG. 8b is a diagrammatic view, and depicts a specular reflector such as a mirror.

To more clearly describe the various important aspects of bar code element reflection properties in relation to the invention, FIGS. 8a-8d are provided to explain the terminology of reflection used herein. FIG. 8a shows the reflection of an incident ray of light 80 from a diffuse reflecting Lambertian surface 86, such as white paper, wherein the relative intensity of a reflected ray 83 at angle Φ from the ray 81 coincident with the surface normal, is expressed as:

$$\text{Intensity}(\text{ray83}) = \cos(\phi) * \text{Intensity}(\text{ray81})$$

The diffuse reflecting properties of white paper provide a wide range of viewing angles for reflected light thus making alignment with a handheld scanner a non-issue. For a specular reflecting surface 87 of FIG. 8b, such as a mirror, incident ray 80 produces reflected ray 82 such that the angle of reflection θ is the same as the angle of incidence. As can be readily appreciated, in order for a scanner to detect light from a specular reflection, it must be very accurately aligned with the specular reflection or it will receive no light at all.

Figure 8C:
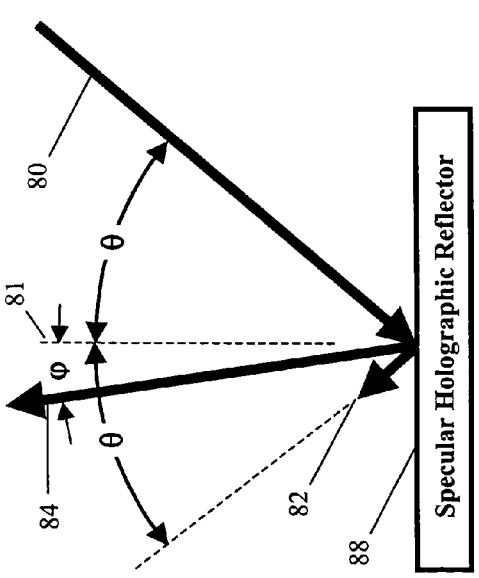
FIG. 8c is a diagrammatic view, and depicts a specular holographic or diffractive reflector with virtual tilt.

The specular holographic reflector 88 of FIG. 8c produces a weak reflected ray 82 from the shiny surface of the holographic media, and a strong reflected ray 84 from a holographic mirror having a virtual tilt such that the reflected angle $\phi$ is not the same as the incident angle $\theta$. The virtual tilt produced by the Bragg planes in a volume reflection hologram or grooves in a diffraction grating is well documented in the prior art and numerous introductory books on the topic and thus will not be further detailed herein. Clearly, the aforementioned alignment problem of a bar code scanner with the specular reflecting surface of FIG. 8b also applies to its holographic counterpart of FIG. 8c.

Figure 8D:
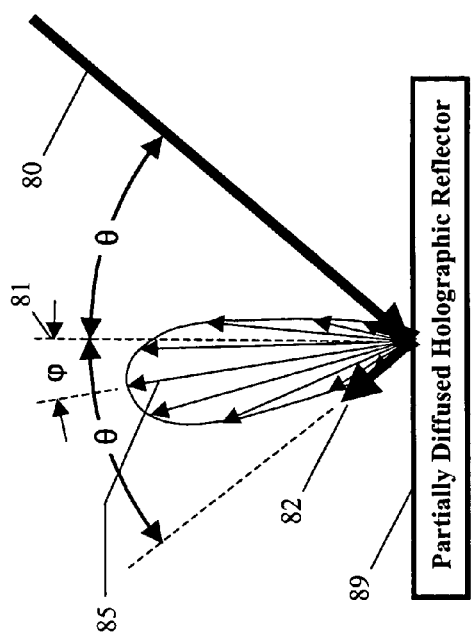
FIG. 8d is a diagrammatic view, and depicts a partially diffused holographic reflector virtual tilt.

The partially diffused holographic reflector 89 of FIG. 8d acts as a sort of lightly frosted or fogged mirror. The angular width of such a reflected beam is typically specified as the full width at half max, meaning the angel as measured from the position of half peak intensity on one side to that of half peak intensity on the other side. The angular width of the reflected rays 85 significantly improves the ease of alignment of anything trying to receive those rays. For example, to successfully align to within one degree is one hundred times harder than trying to align to within 10 degrees because it is a two dimensional alignment problem and the square of the linear ratio applies. However, alignment ease is not strictly limited to the diffusing nature of the reflector, but is mathematically convolved with the angle subtended by the source diameter as viewed from the reflector and the angle subtended by the receiver lens as measured from the reflector. In effect, each of these three effects serves to broaden the alignment range in approximately direct proportion. For example, if the source subtended an angle of 5 degrees, the receiver 5 degrees, and the reflector diffusion was 20 degrees full width at half max, the net alignment range would be approximately 30 degrees. For reasonable functional compatibility with a hand held scanner, the total alignment range should preferably be at least 20 degrees, thus requiring the reflector diffusion to be at least 10 degrees full width at half max when combined with reasonable source and receiver optics having subtended angles similar to that of the example.

Holographic diffusers are well known in the art, as disclosed in U.S. Pat. No. 5,365,354 granted on Nov. 15, 1994 to Jannson. More significantly, the concept of a holographic diffuse reflector having a central axis with an angle of reflection substantially different from the angle of incidence is disclosed in U.S. Pat. No. 6,636,285 granted to Oct. 21, 2003 to Coleman et al.

The first aspect of the invention relates to the need of having secure holographic bar codes readable by hand-held scanners. By its very nature, a hand-held scanner will have poor alignment accuracy with the bar code being read. The alignment problem may be overcome by two separate methods; the first and most obvious is that of broadening the reflection angle by means of utilizing substantially diffuse reflectors for the white code elements of the bar code. The most direct means of accomplishing this is to record a holographic image of a paper and ink bar code, wherein the reproduced holographic image will have diffuse reflecting properties of the white reflecting code elements quite similar to that of the original diffuse reflecting paper from which it was mastered. An improvement to the direct mastering method would be to utilize a computerized dot matrix holographic master origination machine to actually create the diffusing facets according to the bar code pattern desired with the diffusion angle spread desired. These machines have the capability of producing holographic images pixel by pixel with greater than 10,000 dpi resolution to form the image and reflection pattern desired. One important advantage of utilizing a diffused holographic facet over a holographic reproduction of a paper and ink bar code is that by concentrating the reflected light into 45 degree field of view, for example, the bright bar code elements can actually be as much as 5 times brighter than reflections from the Lambertian reflections of white paper because all of the reflected light is concentrated into so much smaller of an angle. This is a property that can easily be ascertained and tested by a bar code scanner as a security feature to help enable differentiation from, for example, a counterfeit holographic bar code directly mastered form a paper and ink bar code. In the preferred embodiment of the invention, the holographic diffuser broadens the field of view by at least 10 degrees, but not more that about 50 degrees, and includes a virtual tilt angle selected so as to optimize the trajectory of the reflected light so that it is substantially centered on the location of the receiver optics. The virtual tilt angle is also selected so as to eliminate reflective interference from the shiny surface of the holographic film, which is satisfied by a virtual tilt of about 10 degrees or more such that surface reflections are not received within the field of view of the electro-optic receiver when it is aligned to receive the reflections from the holographic facets composing the bar code.

Figure 4B:
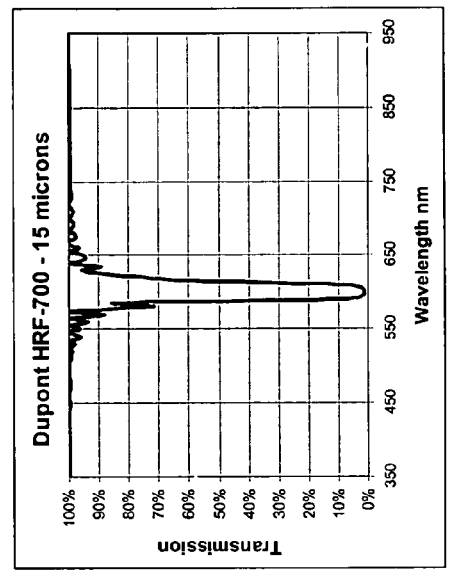
FIG. 4b is a graph, and shows the transmission spectral response of a volume holographic mirror with Dupont HRF-700 photopolymer 15 microns thick.
Figure 4A:
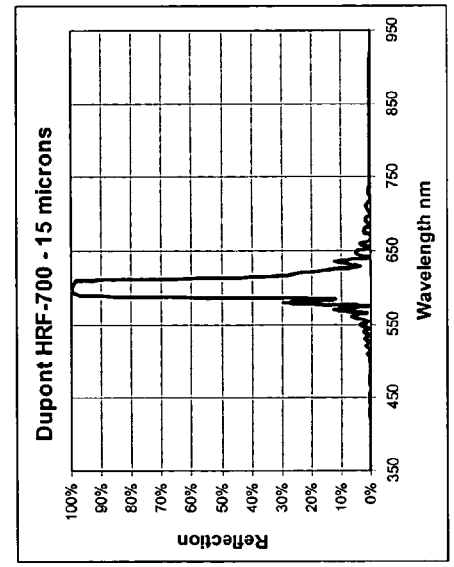
FIG. 4a is a graph, and shows the reflection spectral response of a volume holographic mirror with Dupont HRF-700 photopolymer 15 microns thick.
Figure 14A:
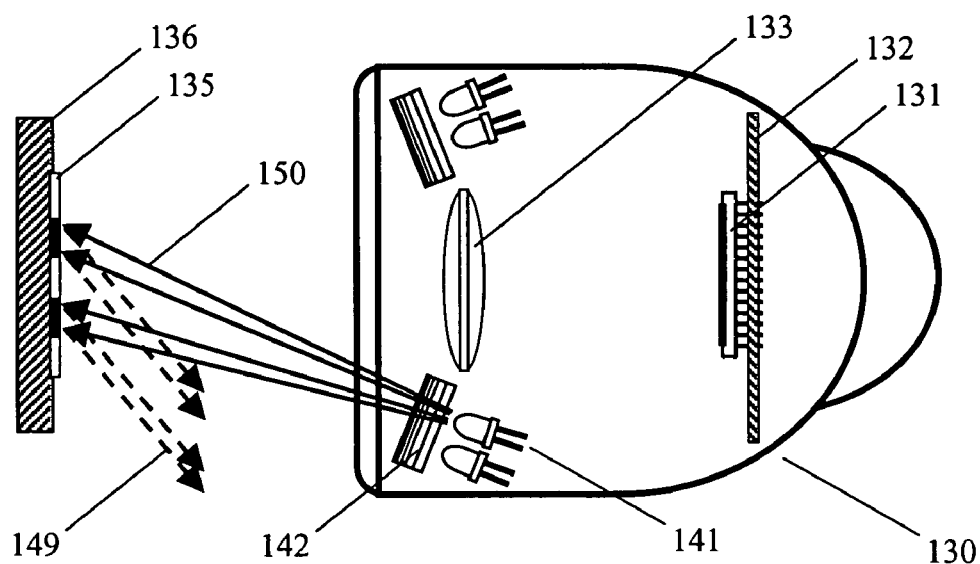
FIG. 14a is a diagrammatic top plan view of the hand-held bar code scanner, and shows illumination of black areas of a bar code.
Figure 14B:
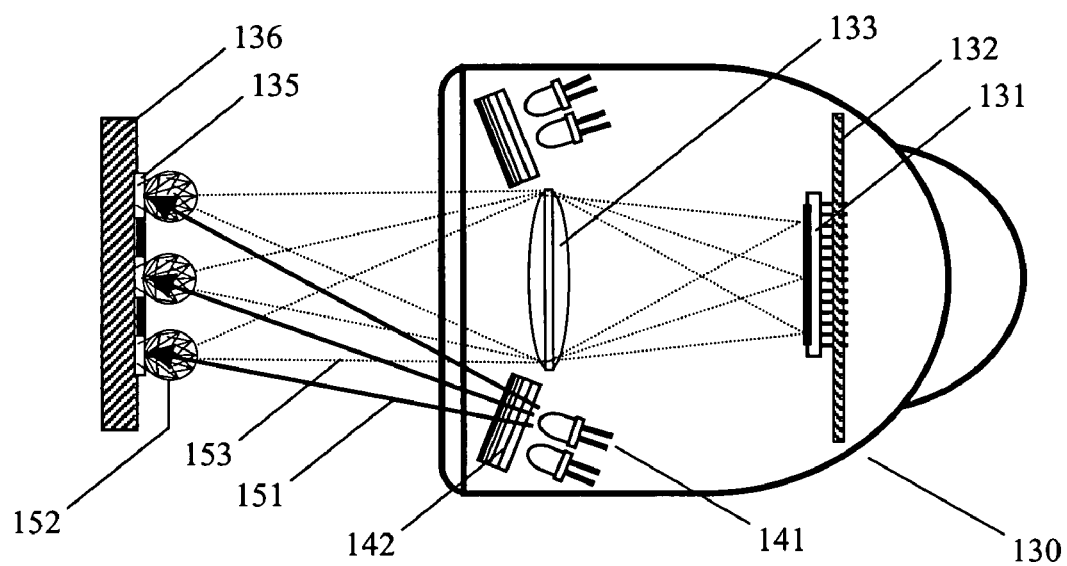
FIG. 14b is a diagrammatic top plan view of the hand-held bar code scanner, and shows illumination of white areas of a bar code.

The second method of broadening the reflection angle in a holographic bar code requires utilizing the excellent specular reflection properties of volume holographic facets in reverse. FIG. 4a shows, for example, the reflective properties of a 15 micron thick volume hologram made with Dupont HRF-700 type photopolymer having index of refraction modulation of its Bragg planes of approximately 6%. This structure is known in the art as a Bragg grating filter. The small reflections from each Bragg plane work together to produce a nearly 100% reflection at the center wavelength of the grating filter. The spectral width of the reflection is determined by the thickness of the photopolymer and relates to the number of wavelengths over which constructive and destructive interference between each of the Bragg plane reflections interact with one another. Correspondingly FIG. 4b shows the spectral transmission of the same filter. If one now overlays this hologram on a white diffusing background and strategically positions the virtual angle of the facet to specularly reflect all of the light from a bar code scanner's illumination LEDs away from the receiving lens, then a bar code is created in which the CCD photosensor of the bar code scanner sees the facets as dark (the light goes elsewhere) and the spaces between the facets as white just as in a normal bar code. FIG. 14a shows a bar code scanner head 130 having LED 141 transmitting, among others not shown, light rays 150 to illuminate bar code 135 on an object 136 wherein the black areas of the bar code are representative of the holographic facets and the white areas are representative of the white background seen through the hologram between the facet areas. Light rays 150 are specifically shown illuminating bar code 135 on its black areas where the holographic facets specularly reflect rays 149 away from lens 133 so that they can never be received by CCD photosensor 131. FIG. 14b shows the same bar code scanner head arrangement, but with light rays 151 from LED 141 illuminating the white spaces between the dark holographic facets. The diffuse reflections 152 from them contain a portion of light that is directed in the field of view 153 of the CCD photosensor 131. Because the white background visible between the holographic facets is diffuse reflecting, it will be easy to align with a hand-held bar code scanner. Conversely, because the reflections of the holographic facets are specular, it is easy to not receive light from these facets and thus easy to align a hand-held bar code scanner to see no light reflected from them.

The second aspect of the invention relates to the need to authenticate the holographic bar code media using the hand-held bar code scanner. While it may be true that a human should be able to reasonably verify that the authentication mark being scanned is indeed holographic, machine verification has time and again proven more reliable in the presence of daydreaming or poorly trained employees. By requiring authentication of the mark with a hand-held bar code scanner, many kinds or holographic characteristics involving precise alignment or the embedding of most holographic optical elements become eliminated as options for holographic media validation because of the precision alignment requirement for their detection. However, one of the primary holographic characteristics that remain as an option for this purpose is the detection of a second image when illuminated from a second angle. The 3-D/stereographic image capability of a hologram is one of the most significant features that attract people to holograms, yet it has not been used to validate the holographic media of authentication marks. To take advantage of this feature, the hologram is made to produce the image of a first bar code when illuminated from a first angle, and produce the image of a second bar code when illuminated from a second angle. Such a stereographic image containing a pair of coaligned bar codes could easily be produced via the previously mentioned computerized dot matrix holographic master origination machine, or by conventional means by which a pair of images is formed through exposing the hologram master to a first bar code using a reference beam at a first angle, and then exposing the same hologram master to a second bar code using a reference beam at a second angle. For example, FIG. 11a and FIG. 11b respectively show the how a bar code, and the associated graphic, would change when the hologram is illuminated from the left and right respectively. FIG. 13a depicts the layout of a bar code scanner head having LED 138 right of the receiving lens and LED 141 left of the receiving lens, each of which are separately activated to illuminate the target bar code 135 of object 136 during the scanning process so that two separate holographic bar code images may be viewed and read. To validate the holographic media, the validation algorithm requires that a pair of bar codes is read, that each bar code is independently valid, and that the two bar codes are different from one another.

It should be readily understood that this concept of validating holographic media by reading stereographic coaligned bar codes utilizing illumination from two separate directions can easily be extended with additional independently controlled illumination sources oriented in other sufficiently optically orthogonal directions such that correspondingly more separate bar code images may be viewed and read from the same hologram. Sufficiently optically orthogonal means that the angle between the best viewing directions for any two bar code images must be sufficient such that one may be scanned without interference of the second. To achieve this objective, the holographic images should be recorded so as to produce separate images at viewing angles separated by at least twice the angular spread of the holographic facets plus the subtended angles of the source and receiver electro-optics. For specular reflecting facets one may typically need at least 20 degrees of viewing angle separation between bar code images for them to be sufficiently optically orthogonal. For diffuse reflecting facets, commensurately more separation will be required.

Figure 2:
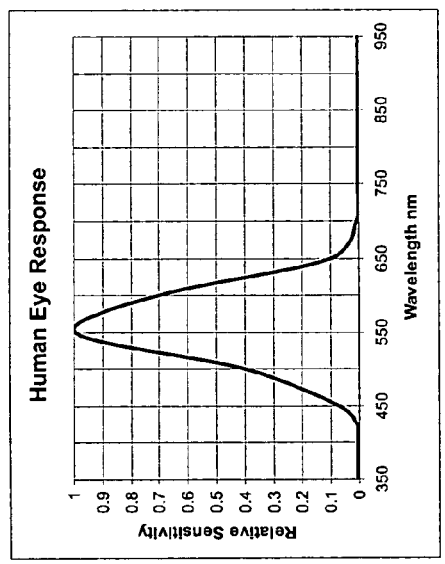
FIG. 2 is a graph, and shows the spectral response of the human eye.

A third aspect of the invention relates to the need for the authentication mark to have serialization capability for the purpose of uniquely identifying the item. Holographic bar codes, by their very nature, involve expensive tooling that make them cost effective only in mass production applications where numerous articles would all have the same bar code. To overcome this debilitating limit of holographic bar codes, a third coaligned infrared bar code can be laminated beneath the holographic bar code in such a manner that the third bar code is not visible at the wavelength used to read the holographic bar codes. Utilization of an infrared ink for printing bar codes one at a time in the usual manner provides the capability of bar code serialization as opposed to batching. As is well known and shown in FIG. 2, human vision extends from approximately 400 nm to 700 nm. FIG. 4a shows that although the hologram is quite reflective at its center 590 nm yellow wavelength, it is both non-reflective and very transparent in the near infrared wavelengths of 880 nm and 940 nm typical of near infrared LEDs. Therefore, it is possible to laminate a printed layer beneath the hologram that provides the desired background reflectivity in visible light while displaying a bar code visible through the hologram when viewed at infrared wavelengths. Prior art as depicted in FIGS. 7a-7c shows infrared invisible bar code technology demonstrating two similar methods of producing the desired infrared bar codes. The ID card of FIG. 7a shows a bar code printed in the ink of FIG. 6 as viewed in visible light. The ID card of FIG. 7b shows a bar code overprinted with a visibly black ink that is transparent in the infrared having spectral characteristics similar to that of FIG. 3. FIG. 7c shows the card of either FIG. 7a or FIG. 7b as viewed in infrared light only. By laminating the stereographic bar codes of the volume hologram over an infrared visible bar code, the authentication marks of FIG. 11 and FIG. 12 are created.

The authentication mark 110 of FIG. 11 is constructed with the hologram laminated over a background 112 appearing black in visible light and wherein the stereographic bar codes 113 and 115 have their white code elements formed by partially diffuse reflecting facets. FIG. 11a and FIG. 11b show the stereographic hologram images 113 and 115 in visible 590 nm light, illuminated from two separate directions, wherein bar codes 113 and 115 are different from one another and logo image 111 is seen to be a 3-D image. FIG. 11c and FIG. 11d show the authentication mark 110 in 880 nm infrared light, wherein at this wavelength the background 112 is highly reflective, the holographic images are fully transparent, and the infrared bar code 116 is now visible. The infrared bar code is the same whether illuminated from the first direction or the second direction. Thus, the test for authentication includes reading two valid but different coaligned bar codes with two different directions of visible light illumination followed by reading a third valid coaligned bar code in infrared light independent of the direction of illumination, as outlined in the flow chart of FIG. 15.

The authentication mark 120 of FIG. 12 is constructed with the hologram laminated over background 122 with the bar code area reflecting brightly at both wavelengths and background 127 of the logo 121 appearing black at both wavelengths in the graphic logo area to improve contrast and visibility. The stereographic bar codes 123 and 125 have their black code elements formed by specular reflecting facets that direct the reflected light away from the photo-sensor receiver. FIG. 12a and FIG. 12b show the stereographic hologram images 123 and 125 in visible 590 nm light, illuminated from two separate directions, wherein bar codes 123 and 125 are different from one another and logo image 121 is seen to be a 3-D image. FIG. 12*c* and FIG. 12*d* show the authentication mark 120 in 880 nm infrared light, wherein at this wavelength the holographic images are fully transparent, and the infrared bar code 126, printed with visible transparent infrared absorbing ink, is now visible. The infrared bar code is the same whether illuminated from the first direction or the second direction. Thus, the test for authentication includes reading two valid but different coaligned bar codes with two different directions of visible light illumination followed by reading a third valid coaligned bar code in infrared light independent of the direction of illumination, as outlined in the flow chart of FIG. 15.

Figure 3:
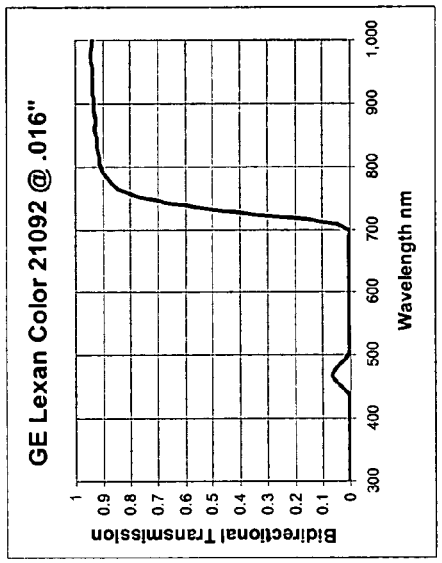
FIG. 3 is a graph, and shows the transmission spectral response of GE Lexan 1/16" thick with dye color 21092.
Figure 9:
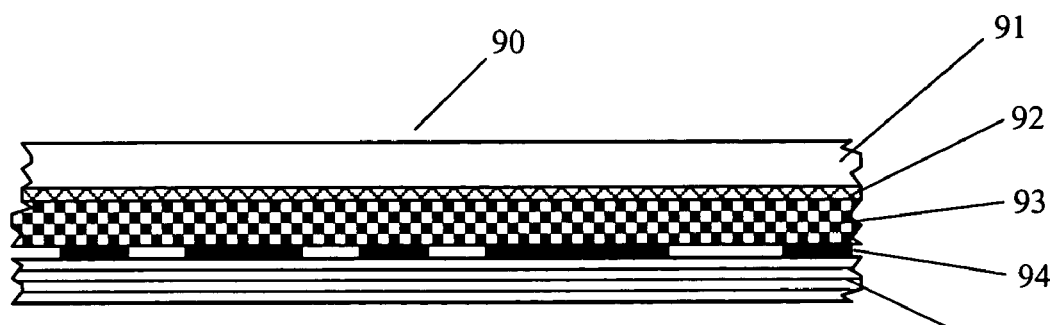
FIG. 9 is an enlarged fragmentary cross-sectional view, and shows the laminated structure for a coaligned holographic bar code over an infrared visible bar code.

FIG. 9 shows a lamination structure for the coaligned bar codes, absent adhesive layers, in which a white diffuse reflecting backing material 95 has a serialization bar code 94 printed on its surface. An infrared transmissive and visibly black filter layer 93 with spectral characteristics such as that shown in FIG. 3 is laminated on top of the serialization bar code 94. A volume reflection hologram 92 protected with a cover layer 91 is laminated on top of filter layer 93 which may also serve as a back protective layer for the hologram. Volume reflection hologram 92 is designed to have diffuse reflecting facets, as previously discussed, such that the diffuse facets produce the equivalent of the white space code elements of a bar code while the black filter layer 93 is visible between the white space code elements providing the equivalent of the black code marks in a common bar code. FIG. 5 shows the spectral response of common inkjet dyes, all three of which used together produce a substantially visibly black color while still being quite transparent in the infrared much like the Lexan sheet of FIG. 3, thus providing an alternative means of achieving the characteristics required of filter layer 93.

A second lamination structure for execution of the infrared visible serialization bar code 94 utilizes the following lamination layers in FIG. 9. The base layer of the bar code 94 again is a white diffuse reflecting layer 95 on which is printed an infrared visible ink 94 having the spectral characteristics as shown in FIG. 6 wherein the ink is transparent in visible light but absorbs light in the infrared to form the black code elements of the bar code. One source for the ink of FIG. 6 is model MSC3600 printing ink produced by HW Sands Corp. Laminated on top of the serialization bar code 94 is a hologram sandwich having hologram 92 between two protective cover layers 91 and 93, both layers being transparent in infrared as well as the visible wavelengths. In this embodiment, the hologram has a white background in visible light and thus requires the use of holographic bar codes wherein facets directing light away from the receiving lens of the scanner form the black code elements of the bar code as previously described.

Figure 10A:
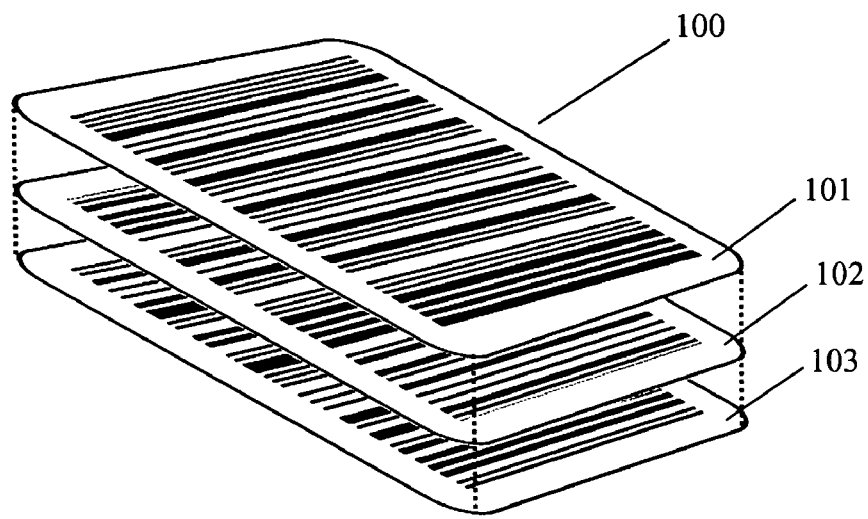
FIG. 10a is an exploded perspective view, and shows three coaligned bar codes.

FIG. 10*a* shows three coaligned bar codes 100 having a printed infrared bar code 103 at the bottom and the pair of holographic bar codes 101 and 102 laminated in the same orientation above the other. In this manner, an operator need only scan in a single location to acquire the information from all three bar codes, which of course is paramount to the simplicity and security value of the overall mark.

Figure 10B:
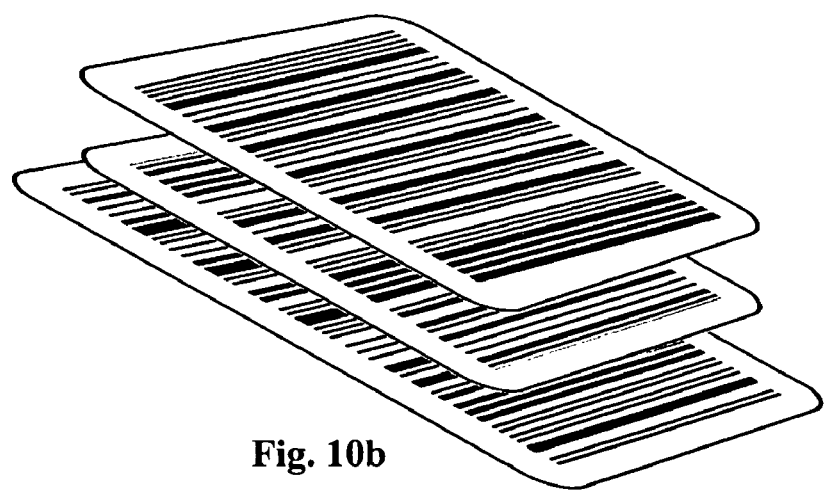
FIG. 10b is an exploded perspective view, and shows three coaligned bar codes not all of identical length.

FIG. 10*b* depicts three coaligned bar codes, but demonstrates that they all need not be of the same size to be coaligned bar codes for the purpose of this invention since a hand-held bar code scanner still need only scan in a single physical location to acquire the data from all three coaligned bar codes.

A fourth aspect of the invention relates to utilizing a human readable alphanumeric confirmation code 114 adjacent to the coaligned bar codes 113, 115, and 116 of the authentication mark 110 of FIG. 11*a* and FIG. 11*b* for purposes of security rather than for redundancy. The human readable digits 15 on the UPC bar code 10 of FIG. 1 are typical of linear bar codes wherein the human readable digits have been defined by their associated standards as providing a redundant method for manually entering the item code should the bar code scanner fail to read a damaged bar code. To add security value, the confirmation code 114 of FIG. 11*a* and FIG. 11*b* is necessarily printed uniquely for each authentication mark, as is the serialized infrared bar code, and the content of the alphanumeric code must be other than a direct representation (i.e. character set substitution) of the code elements themselves, whether being derived from the coaligned bar codes in their entirety, or derived from only a portion thereof. There are two preferred methods for the generation of the confirmation code; a) utilizing a functional cipher of the data from each of the coaligned bar codes, or b) selecting a substantially random code otherwise only known to a database created at the authentication mark's time of manufacture.

Figure 16:
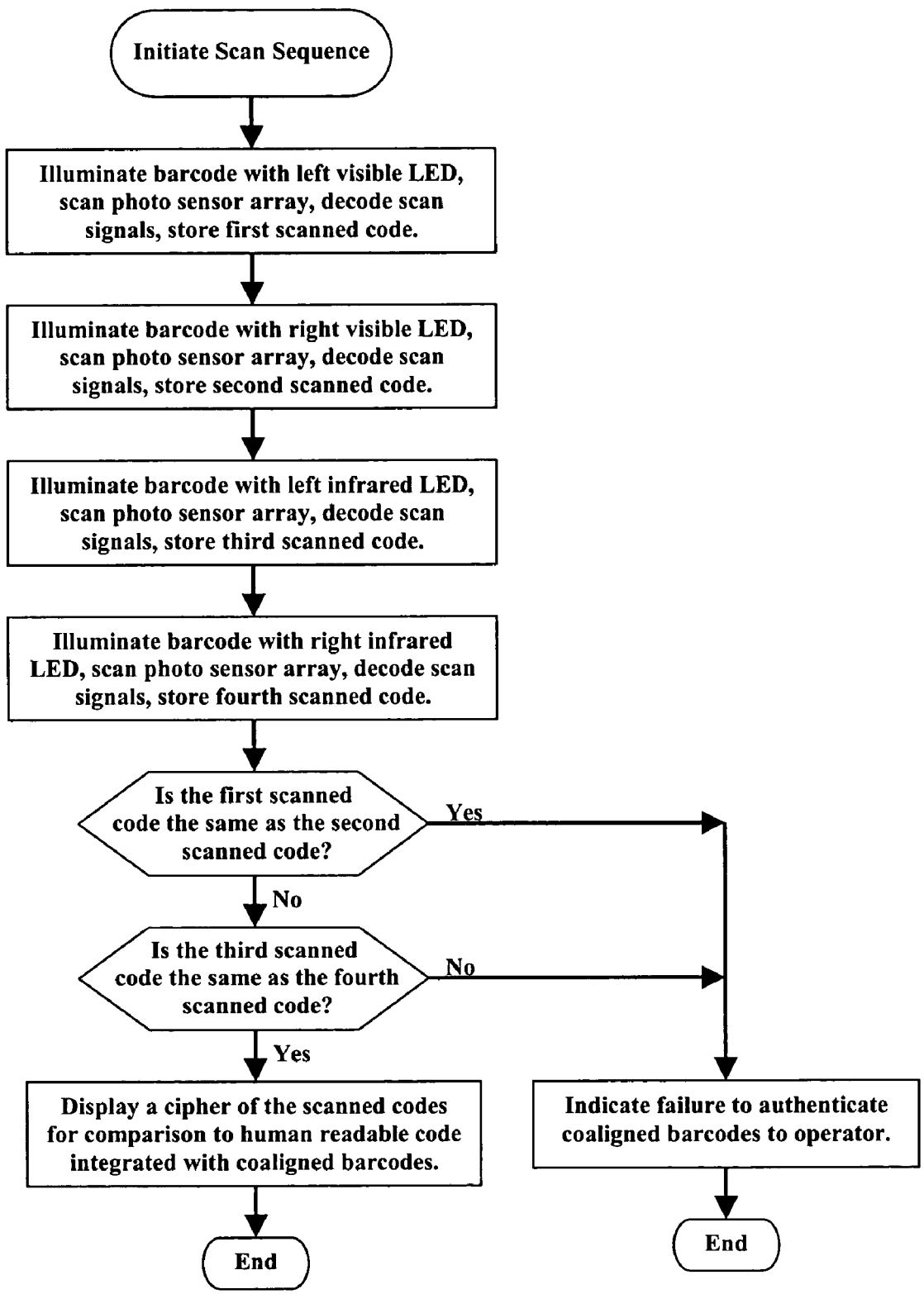
FIG. 16 is a flowchart, and shows steps for authenticating the tipple coaligned bar code of the invention, including displaying a cipher of the scanned codes.

In the first method of generating the confirmation code, a combination of mathematical and logical functions (functional cipher) is used during production to generate the confirmation code for printing with the authentication mark. The functional cipher may be any algorithm that may be locally computed by a microcontroller within a bar code scanner based on the data read from the coaligned bar codes without the need for queries to a remote authority. For example, the bar code scanner 130 of FIG. 13 utilizes LEDs 137, 138, 140 and 141 to sequentially illuminate target bar code 135 on object 136 through cylindrical lenses 139 and 142 and protective window 134 such that each coaligned bar code image is sequentially formed on CCD photosensor 131 located on control circuit board 132. Control means 143 then performs a functional cipher on the read bar code data to produce a confirmation code for display 146 viewable by the operator of the bar code scanner 130. A flowchart of this process is shown in FIG. 16. The operator can then compare the displayed confirmation code 146 on the bar code scanner 130 of FIG. 13 with the confirmation code 114 adjacent the coaligned bar codes 113, 114 and 115 of FIGS. 11*a*-11*d* as the final security check of the authentication mark.

Figure 17:
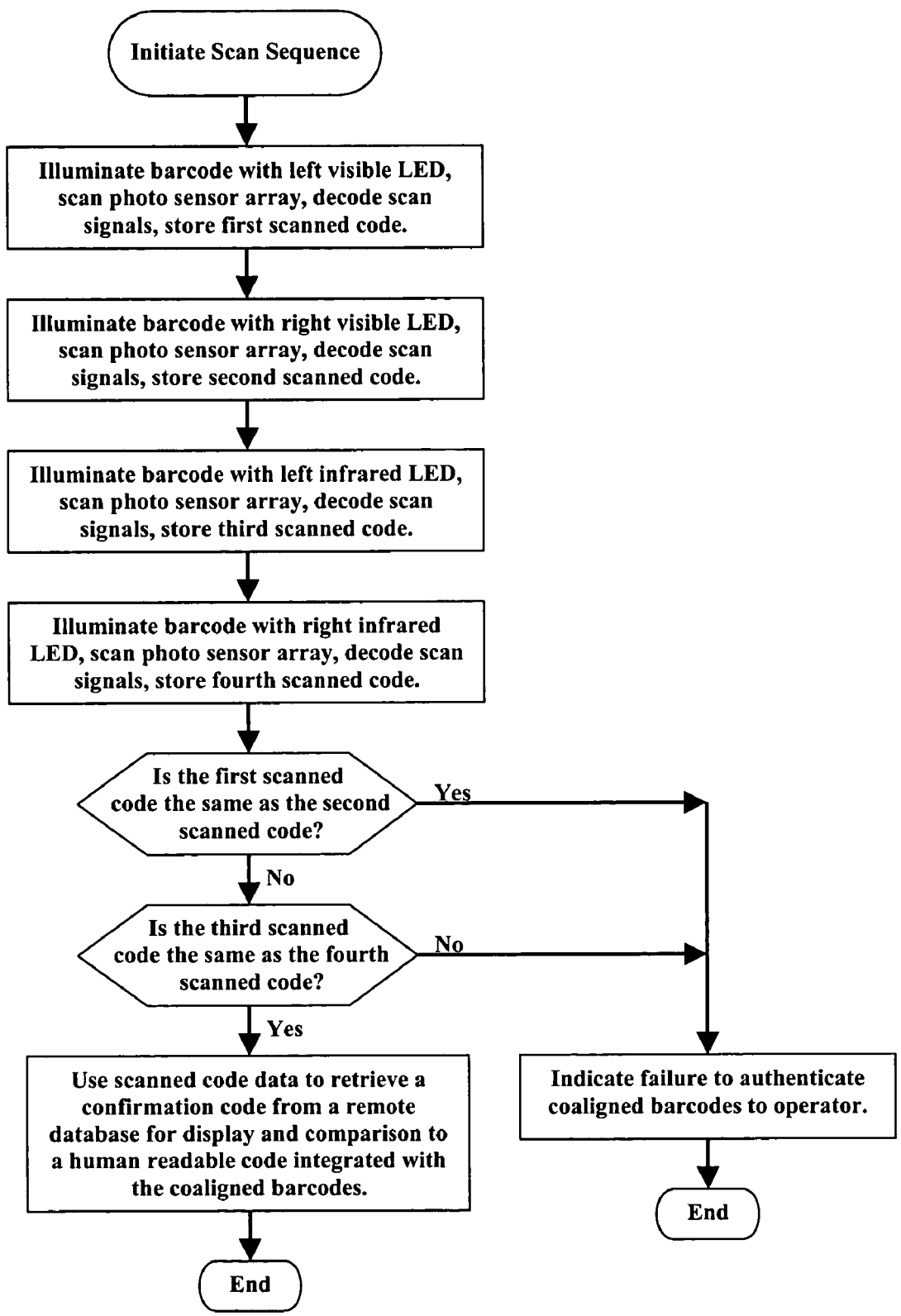
FIG. 17 is a flowchart, and shows steps for authenticating the tipple coaligned bar code of the invention, including displaying a confirmation code provided by a remote database.

In the second method of generating the confirmation code, a substantially random number is generated during manufacture of the authentication mark, which is both stored in a database and printed as the confirmation code adjacent the coaligned bar codes. To validate the authentication mark with this confirmation code the bar code scanner 130 of FIG. 13 utilizes LEDs 137, 138, 140 and 141 to sequentially illuminate target bar code 135 on object 136 such that each coaligned bar code image is formed on CCD photosensor 131 on control circuit board 132. Control means 143 communicates the validated bar code data via communication means 144 for transmission to a remote database control means which responds to the communication means with the substantially random confirmation code held in its database and referenced by the validated bar code data. Communication means 144 provides the confirmation code to the control means 143 for display 146 viewable by the operator of the bar code scanner 130. A flowchart of this process is shown in FIG. 17. The operator can then compare the displayed confirmation code 146 on the bar code scanner 130 of FIG. 13*c* with the confirmation code 114 adjacent the coaligned bar codes 113, 114 and 115 of FIGS. 11*a*-11*d* as the final security check of the authentication mark.

A hybrid of the first and second method of generating the confirmation code as described above is also possible. In the hybrid method, the bar code scanner displays a confirmation code 146 having a first part based on a functional cipher of the validated bar code data and a second part based on a substantially random value retrieved from a remote database. The operator can then compare the displayed confirmation code 146 on the bar code scanner 130 of FIG. 13*c* with the confirmation code 114 adjacent the coaligned bar codes 113, 114 and 115 of FIGS. 11*a*-11*d* as the final security check of the authentication mark.

Most design aspects of bar code scanner 130 are well known in both patent and product prior art and require only general description to supplement understanding of the particular implementation conveyed herein. LEDs 137, 138, 140 and 141 illuminate target bar code 135 on an object 136 through cylindrical lenses 139 and 142, which provide the function of spreading light in a relatively narrow band along the length of the target bar code in a manner aligned with the field of view of the CCD photosensor array 131 as focused through lens 133. The LEDs are chosen to have a light radiation pattern of preferably approximately 45 to 60 to provide sufficient spread of their emitted light along the horizontal length of target bar code while the cylindrical lenses 139 and 142 provide focus of the emitted light only in the vertical direction to substantially limit the vertical spread of the emitted light thus producing the aforementioned horizontal narrow band of light. Examples of suitable LEDs include the Optek OP294 infrared LED and the LiteOn LTL-4252N yellow LED. The CCD photosensor array 131 may be any of many available linear arrays such as the Perkin Elmer RL1024PAQ-712 or the Silicon Video ELIS-1024, both of which have a 1024×1 linear arrangement if of photosensors. Linear arrays of such length are quite suitable for bar codes similar to the UPC bar code in length. However, both longer and shorter arrays are also available from multiple suppliers, as are two dimensional arrays for implementations of two dimensional bar codes. The resolution of the photosensor array is preferably chosen such that the smallest dimensional optical feature of the bar code corresponds to at least two pixels for a linear array CCD and at least 4 pixels for a two dimensional array CCD.

Control means 143 is comprised primarily of a microcontroller having on-board program memory such as one-time-programmable EPROM for holding the program algorithms, RAM memory for holding operational variables used by the program algorithms, I/O pins for controlling sequential illumination of the LEDs and for clocking the photosensor data signals from the CCD photosensor array, analog to digital converter circuitry for converting the photosensor data signals from analog to digital values for use by the program algorithms, and I/O pins for driving display 146. The MC68HC908AP16 from Motorola is one example of a suitable microcontroller having the above functions integrated within it. Communication means 144 may consists of a communication interface circuit, such as an RS232 UART or Universal Serial Bus (USB) for communicating with external databases or control equipment, which may optionally be incorporated into the microcontroller of the control means 143 as it is an RS232 UART within the MC68HC908AP16. Bar code scanner 130 is powered by and communicates through cable 145, but may alternatively be powered by batteries and/or communicate by wireless means, such as an infrared IRDA link or RF WiFi link. Display 146 may be implemented with an LCD, LED, or VFD module having multiple characters, such as the 4-character Fairchild MSQ6141C seven segment red LED display module.

Figure 15:
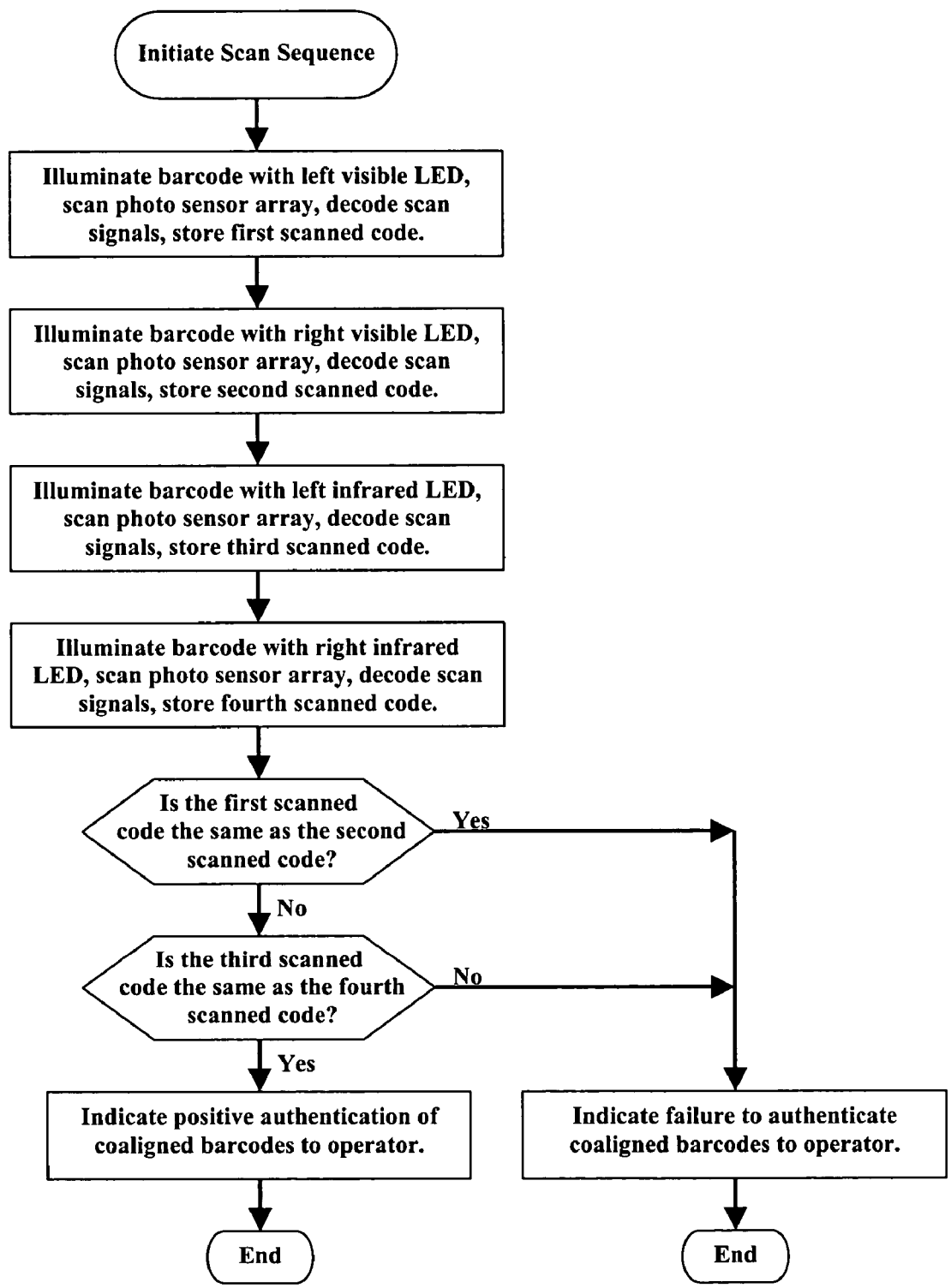
FIG. 15 is a flowchart, and shows steps for authenticating the tipple coaligned bar code of the invention.

The algorithms executed by the microcontroller of control means 143 include those necessary to produce the timing control signals for display 146 and produce the timing control signals for the CCD 131 according to the manufacturer's specification the chosen parts, functional ciphers as previously described, and the algorithms of FIG. 15, 16, or 17 to enable reading of the coaligned bar codes. Algorithms for extraction of the bar code symbols from the CCD photosensor array signals are well known by those skilled in the art and bar code scanner engines for performing this function can be purchased as a component from Symbol Technologies.

Although a preferred embodiment of the invention has been specifically illustrated and described herein, it is to be understood that minor variations may be made in the apparatus without departing from the spirit and scope of the invention, as defined by the appended claims.

I claim:

1. An authentication mark associated with a label, tag, card, container, product or article comprising:
   a plurality of machine readable coaligned bar codes disposed within the authentication mark;
   a first of said coaligned bar codes being visible when illuminated from predominantly a first direction;
   a second of said coaligned bar codes being visible when illuminated from predominantly a second direction; and
   said first and second bar codes having optical characteristics chosen such that the second bar code is substantially invisible when illuminated from the first direction and the first bar code is substantially invisible when illuminated from the second direction.

2. The authentication mark as defined in claim 1 wherein the authentication mark includes an embossed hologram.

3. The authentication mark defined in claim 1 wherein the authentication mark includes a volume reflection hologram, and the authentication mark is visible predominantly at a first wavelength and is substantially invisible at a second wavelength.

4. The authentication mark defined in claim 3 including a third coaligned bar code visible through the first and second bar codes when illuminated at the second wavelength at either of the first and second directions and being substantially invisible when illuminated at the first wavelength in any direction.

5. The authentication mark defined in claim 4 wherein the first wavelength is between 400 nm and 700 nm and the second wavelength is between 800 nm and 1,000 nm.

6. The authentication mark defined in claim 1 or 4 further including a human readable alphanumeric code adjacent to the machine readable coaligned bar codes for comparing with an alphanumeric code produced by a bar code scanner as a result of having read the machine readable authentication mark.

7. The authentication mark defined in claim 6 wherein the human readable alphanumeric code contains at least two characters which are based on a functional cipher of the coaligned bar code data.

8. The authentication mark defined in claim 6 wherein the human readable alphanumeric code contains at least two characters which are substantially randomly determined for each specific coaligned bar code data.

9. An authentication mark associated with a label, tag, card, container, product or article comprising:

a background layer having substantially high reflectivity and substantially diffuse reflecting characteristics at a predetermined bar code scanning wavelength;

a volume reflection hologram layer laminated over said background layer;

said volume reflection hologram layer produces images of at least first and second holographic bar codes coaligned with one another;

said holographic bar codes being formed by holographic facets functional at said predetermined bar code scanning wavelength and patterned to match black elements of said bar codes;

said first bar code being readable by a bar code scanner when illuminated from predominantly a first direction;

said second bar code being readable by a bar code scanner when illuminated from predominantly a second direction; and said first and second directions of illumination and optical characteristics of said holographic facets forming said first and second bar codes being chosen such that the second bar code is substantially invisible when illuminated from the first direction and the first bar code is substantially invisible when illuminated from the second direction.

10. An authentication mark associated with a label, tag, card, container, product or article comprising:

a background layer having substantially low reflectivity at a predetermined bar code scanning wavelength;

a volume reflection hologram layer laminated over the background layer;

said volume reflection hologram layer produces images of at least first and second holographic bar codes coaligned with one another;

said holographic bar codes being formed by diffusing holographic facets functional at said predetermined bar code scanning wavelength and patterned to match white elements of said bar codes;

said diffusing holographic facets having a full width at half max angular spread of the reflected beam that is preferably between 10 degrees and 50 degrees and a central angle that is at least 10 degrees different from the specular reflection of the layer's surface;

said first bar code being readable by a bar code scanner when illuminated from predominantly a first direction;

said second bar code being readable by a bar code scanner when illuminated from predominantly a second direction; and said first and second directions of illumination and optical characteristics of said holographic facets forming said first and second bar codes being chosen such that the second bar code is substantially invisible when illuminated from the first direction and the first bar code is substantially invisible when illuminated from the second direction.

11. The authentication mark defined in claim 9 or 10 wherein the first and second bar codes are visible predominantly at a first wavelength and are substantially invisible at a second wavelength, and further including a third coaligned bar code visible through the first and second bar codes when illuminated at the second wavelength at either of the first and second directions and substantially invisible when illuminated at the first wavelength in any direction.

12. The authentication mark defined in claim 11 further including a human readable alphanumeric code adjacent to the machine readable coaligned bar codes for comparing with an alphanumeric code produced by a bar code scanner as a result of having read the machine readable authentication mark.

13. The authentication mark defined in claim 12 wherein the human readable alphanumeric code contains at least two characters which are based on a functional cipher of the coaligned bar code data.

14. The authentication mark defined in claim 12 wherein the human readable alphanumeric code contains at least two characters which are substantially randomly determined for each specific coaligned bar code data.

* * * * *